United States Patent [19]
Sarrine

[11] Patent Number: 5,580,016
[45] Date of Patent: *Dec. 3, 1996

[54] SUPPORT SYSTEM FOR AN EQUIPMENT HOUSING

[75] Inventor: Robert J. Sarrine, Beaumont, Tex.

[73] Assignee: Helena Laboratories Corporation, Beaumont, Tex.

[*] Notice: The term of this patent shall not extend beyond the expiration date of Pat. No. 5,370,347.

[21] Appl. No.: 345,433

[22] Filed: Nov. 21, 1994

Related U.S. Application Data

[63] Continuation-in-part of Ser. No. 86,917, Jul. 7, 1993, Pat. No. 5,370,347.

[51] Int. Cl.$^6$ .................................................. F16M 11/24
[52] U.S. Cl. ........................................................... 248/188.2
[58] Field of Search .............................. 248/188.2, 188.3, 248/188.4, 188.1, 188.5; 312/351.7, 351.8

[56] References Cited

U.S. PATENT DOCUMENTS

| | | |
|---|---|---|
| 1,104,891 | 7/1914 | Heusser . |
| 2,375,872 | 5/1945 | Ress ...................................... 248/188.2 |
| 3,491,977 | 1/1970 | Iller ...................................... 248/188.4 |
| 3,674,678 | 7/1972 | Post, Jr. et al. . |
| 3,750,989 | 8/1973 | Bergenson ........................... 248/188.2 |
| 3,882,729 | 5/1975 | Roach . |
| 3,954,241 | 5/1976 | Carlson ................................ 248/188.3 |
| 4,130,824 | 12/1978 | Amos et al. . |
| 4,192,564 | 3/1980 | Losert .................................. 248/188.3 |
| 4,204,767 | 5/1980 | Kato et al. . |
| 4,222,843 | 9/1980 | Suzuki et al. . |
| 4,236,828 | 12/1980 | Kaneko et al. . |
| 4,272,187 | 6/1981 | Birdsall et al. . |
| 4,298,796 | 11/1981 | Warner et al. . |
| 4,306,958 | 12/1981 | Suzuki et al. . |

(List continued on next page.)

FOREIGN PATENT DOCUMENTS

| | | |
|---|---|---|
| 246873 | 11/1987 | European Pat. Off. . |
| 307332 | 3/1989 | European Pat. Off. . |
| 398388 | 11/1990 | European Pat. Off. . |
| 459214 | 12/1991 | European Pat. Off. . |
| 2269890 | 9/1973 | France . |
| 2628215 | 9/1989 | France . |
| 896420 | 10/1953 | Germany . |
| 3524049 | 1/1987 | Germany . |
| 9216432 | 4/1993 | Germany . |
| 210074 | 3/1924 | United Kingdom . |
| 390598 | 4/1933 | United Kingdom . |

OTHER PUBLICATIONS

Polyacrylamide Slab Electrophoresis F'ld by Electroph. into Antibody–Containing Agarose Gel, Analy.Bioch.40 pp. 232–236, 1971.

Electroph. Crossed Immunoelec; & Isoelectric Focusing in Agarose Gels w/Red'd Electroenddematic Flow, Analy-.Bioch.59 pp. 200–213, 1974.

Isoelectric Fosucing, and Immuno–precipitation in Slabs of Agarose, Weiss et al, Prog. in Iso. Foc & Isotech. pp. 93–98, 1975.

Patent Abstracts of Japan, vol. 10, No. 259 (E–434) (2315) 4 Sep. 1986 & JP–A–61 085 029 (Mitsubishi Electric Corp) 30 Apr. 1986.

Primary Examiner—Ramon O. Ramirez
Attorney, Agent, or Firm—Dorsey & Whitney LLP

[57] ABSTRACT

A support system for an equipment housing includes a pair of screw-adjustable legs at one end of the housing and a pivoting trestle at the other end. The pivoting trestle is made of two channel members, one nested inside the other. The channel members have side walls, and a bolt extends through holes in the side walls to pivotally mount one member with respect to the other. Alternatively, the members can be pivotally connected together using a ball-and-socket or cylinder-and-sleeve connection. The housing can be levelled by adjusting the effective length of the two legs, and the trestle automatically pivots to accommodate these adjustments as they are made.

9 Claims, 4 Drawing Sheets

U.S. PATENT DOCUMENTS

| | | |
|---|---|---|
| 4,360,413 | 11/1982 | Lee . |
| 4,360,418 | 11/1982 | Golias . |
| 4,391,689 | 7/1983 | Golias . |
| 4,501,163 | 2/1985 | MacDermott et al. . |
| 4,572,671 | 2/1986 | Kaneko . |
| 4,578,169 | 3/1986 | Vicario et al. . |
| 4,666,578 | 5/1987 | Yamamoto . |
| 4,672,857 | 6/1987 | MacDermott . |
| 4,679,652 | 7/1987 | Cervantes, Sr. ............ 248/188.3 X |
| 4,709,810 | 12/1987 | Mayes . |
| 4,781,464 | 11/1988 | Allington et al. . |
| 4,790,176 | 12/1988 | Mortean d'Autry . |
| 4,801,114 | 1/1989 | Price ............................. 248/188.3 |
| 4,810,348 | 3/1989 | Sarrine et al. . |
| 4,821,586 | 4/1989 | Scordato et al. . |
| 4,827,780 | 5/1989 | Sarrine et al. . |
| 4,844,786 | 7/1989 | Sugihara et al. . |
| 4,874,491 | 10/1989 | Stalberg . |
| 4,890,247 | 12/1989 | Sarrine et al. . |
| 4,892,639 | 1/1990 | Sarrine et al. . |
| 4,909,920 | 3/1990 | Sarrine et al. . |
| 4,911,816 | 3/1990 | Love et al. . |
| 4,938,080 | 7/1990 | Sarrine et al. . |
| 4,954,237 | 9/1990 | Sarrine et al. . |
| 4,955,569 | 9/1990 | Hottman ........................ 248/188.2 |
| 4,960,999 | 10/1990 | McKean et al. . |
| 4,963,243 | 10/1990 | Ogawa et al. . |
| 4,975,173 | 12/1990 | Tansamrit et al. . |
| 4,986,891 | 1/1991 | Sarrine et al. . |
| 4,999,340 | 3/1991 | Hoffman et al. . |
| 5,045,164 | 9/1991 | Tansamrit et al. . |
| 5,089,111 | 2/1992 | Zhu . |
| 5,090,255 | 2/1992 | Kenney . |
| 5,145,270 | 9/1992 | Darden ............................ 248/118 |
| 5,171,410 | 12/1992 | Guadagno et al. . |
| 5,209,831 | 5/1993 | MacConnell . |
| 5,370,347 | 12/1994 | Sarrine ........................... 248/188.2 |

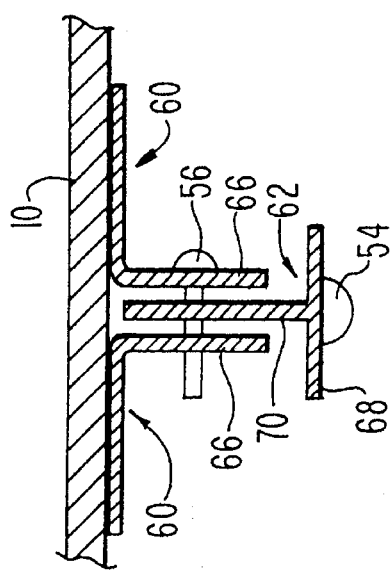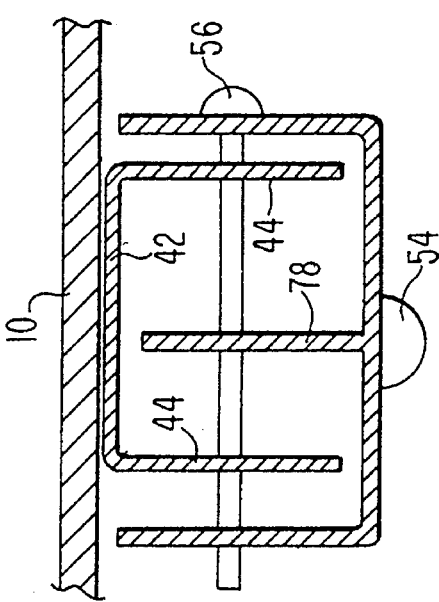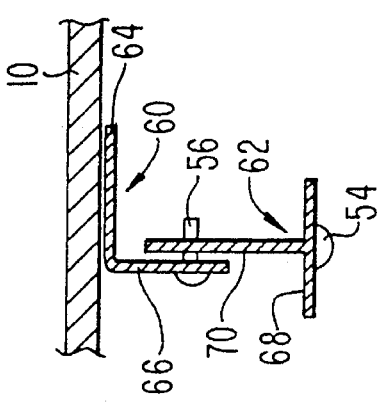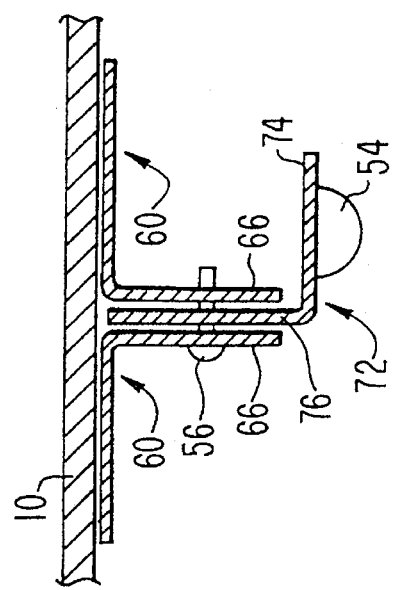

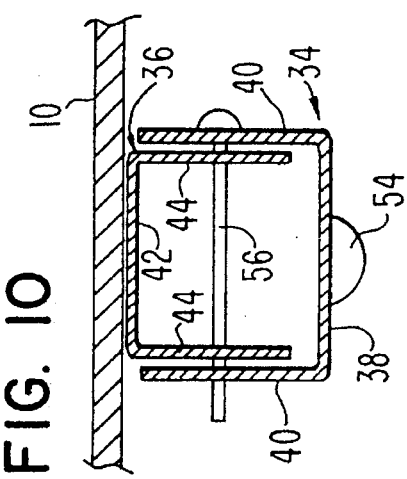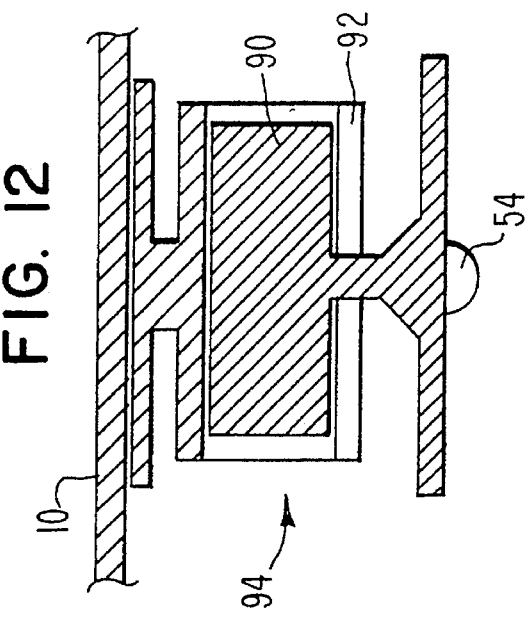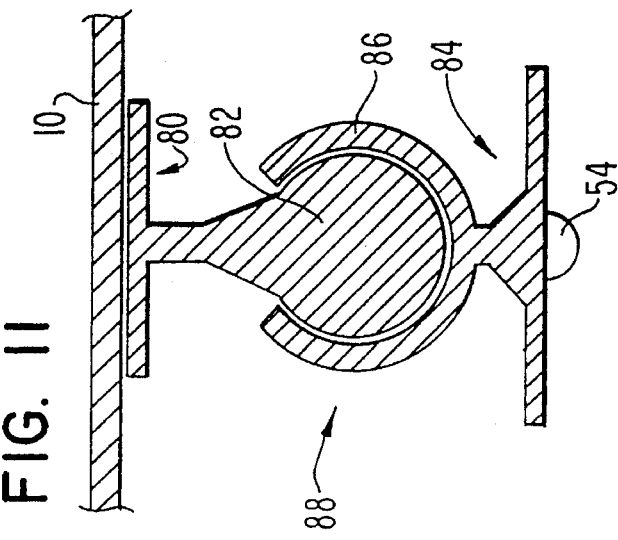

SUPPORT SYSTEM FOR AN EQUIPMENT HOUSING

CROSS-REFERENCE TO RELATED APPLICATIONS

This application is a continuation-in-part application of, and claims the priority of, U.S. patent application Ser. No. 08/086,917, now U.S. Pat. No. 5,370,347, to Robert J. Sarrine, titled Support System for an Equipment Housing, and filed on Jul. 7, 1993, the subject matter of which is incorporated herein by reference.

BACKGROUND OF THE INVENTION

The present invention is directed to a system for supporting an equipment housing on a surface, and more particularly to a support system which can easily be adjusted to level the equipment housing.

Some equipment, such as medical diagnostic equipment, must be level in order to achieve optimum performance. Screw-adjustable legs are known for this purpose. Such legs are typically used at the four corners of the housing and their lengths are adjusted as necessary to make the housing level. Additional screw-adjustable legs may be used to provide further support if the equipment is particularly heavy.

Most people have experienced unstable tables or chairs which wobble because their legs are slightly different in length or because the legs rest on an uneven surface. The same problem is present in equipment housings. If an equipment housing has four or more screw-adjustable legs, the length of each leg must be adjusted precisely with respect to the other legs so that each leg bears its share of the total weight and does not extend so far that it lifts other legs from the supporting surface.

A table or chair with three legs does not suffer from this instability problem. From a geometrical point of view, the table or chair is supported at a fixed distance from each of three points defined by the feet of the legs, regardless of their length. An equipment housing could also be supported stably if three screw-adjustable legs were used. However, equipment housings are typically rectangular. If two legs were used adjacent one end and the third leg adjacent the other, the third leg would generally support approximately the same weight as the first two legs together (assuming that the weight is uniformly distributed within the housing). This increased load on the third leg might damage the surface on which it rests. Furthermore, if the third leg is sufficiently rugged to bear its share of the weight, the first two legs would have to be unnecessarily rugged if they are selected to match the third leg and thus present the same visual appearance.

SUMMARY OF THE INVENTION

An object of the invention is to provide a system for supporting an equipment housing so that the equipment housing can be easily levelled.

Another object is to provide an easy-levelling support system without the disadvantage of using three adjustable-length legs.

These and other objects which will become apparent in the ensuing detailed description can be attained by providing an elongated member having a central portion, means for pivotally connecting the central portion of the elongated member to an equipment housing adjacent one end of the equipment housing so that the elongated member is generally horizontal, and a pair of adjustable-length legs mounted on the equipment housing adjacent its other end. The elongated member preferably includes a first extruded metal channel member and the means for pivotally connecting preferably includes a second extruded metal channel member. Typically, one of the channel members is nested within the other channel member.

The channel members have side panels which are pierced by holes, and an elongated element such as a bolt extends through the holes to pivotally connect the first channel member to the second channel member. Alternatively, the channel members can include an integrally formed or attached ball-and-socket or cylinder-and-sleeve connection.

The side panels of the first channel member are preferably machined to reduce their height except in the region of the holes or pivot connection; this increases the pivot angle that can be achieved.

BRIEF DESCRIPTION OF THE DRAWINGS

FIGS. 6 through 12 are sectional views of various pivot connections taken in the same illustrational direction as FIG. 5.

DESCRIPTION OF THE PREFERRED EMBODIMENTS

Figure 1:
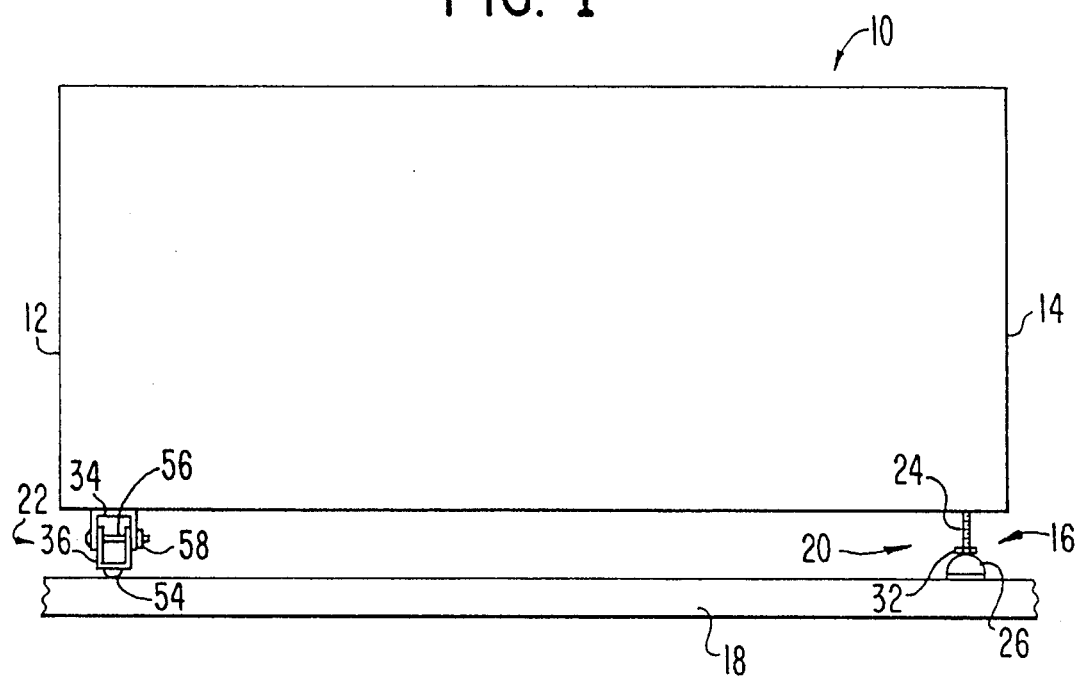
FIG. 1 is a front elevational view of an equipment housing having the easy-levelling support system of the present invention.

In the Figures, an equipment housing 10 has a left end 12 and a right end 14. The equipment mounted in the housing 10 may, for example, be medical diagnostic equipment, such as that disclosed in an application entitled "Automatic Electrophoresis Method and Apparatus," Ser. No. 08/079,378, filed by Robert J. Sarrine et al on Jun. 21, 1993, and assigned to the assignee of the present application. The equipment disclosed in this application is heavy, weighing perhaps 60 kilograms. In order to avoid degrading the accuracy of the equipment when it is employed in diagnostic procedures, it is desirable for it to be level.

An easy-levelling support 16 for supporting housing 10 on a surface such as laboratory bench 18 includes a pair of screw-adjustable legs 20 at right end 14 and a pivoting trestle 22 at left end 12.

Screw-adjustable legs 20 are commercially available. Each leg 20 includes a threaded shaft 24 and a cup-like foot member 26 which is mounted at the lower end of shaft 24 so as to swivel with respect to shaft 24. A rubber pad 28 is attached to foot member 26 to protect the surface of bench 18 and to additionally keep housing 10 from sliding. A metal block 30 having a threaded bore (not illustrated) is affixed inside housing 10. Shaft 24 is screwed into the threaded bore. A nut 32 is affixed to shaft 24 adjacent foot member 26. It will be apparent that nut 32 can be gripped with a wrench (not illustrated) to rotate shaft 24 and thereby adjust the effective length of leg 20 beneath housing 10.

Typically, pivoting trestle 22 includes a generally U-shaped channel member 34 and another generally U-shaped channel member 36, both of which are made from an extruded metal such as aluminum. Of course, other shaped channel members are contemplated by the present invention, as will be subsequently explained. Channel member 34 has a floor panel 38 and two side panels 40 and, similarly, channel member 36 has a floor panel 42 and two side panels 44. Channel segments for use in making channel members 34 and 36 are commercially available.

Figure 4:
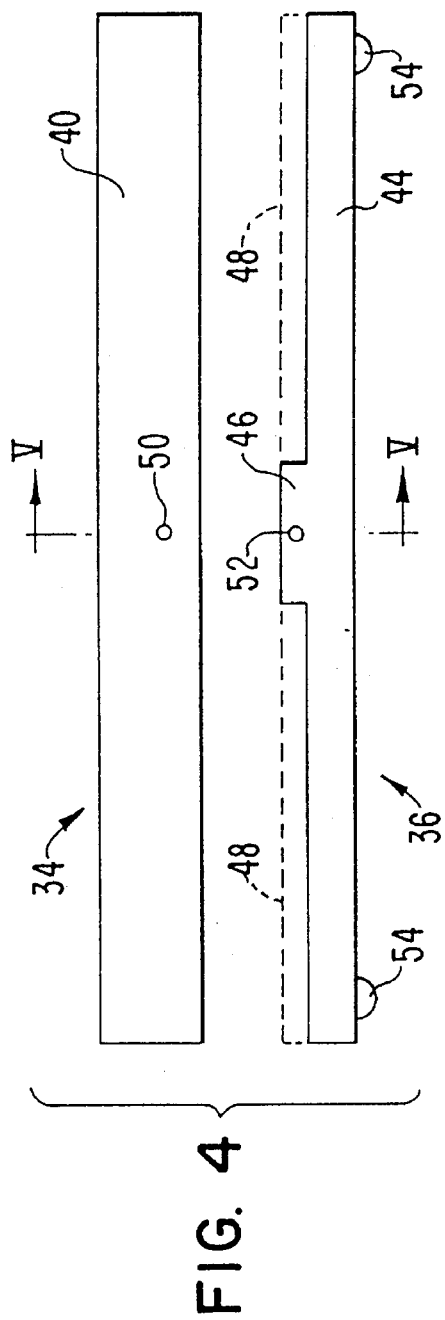
FIG. 4 is an exploded view illustrating the channel members of a pivoting trestle.

As is illustrated in FIG. 4, the side panels 44 of channel member 36 have a reduced height except at central portion 46. Dotted lines 48 illustrate portions of a commercially available channel segment that are cut away during fabrication of channel member 46.

Holes 50 are provided in channel member 34 and holes 52 are provided in side panels 44 of channel member 36 at central portion 46. Rubber pads 54 are adhesively attached to the outer side of floor panel 42.

Figure 2:
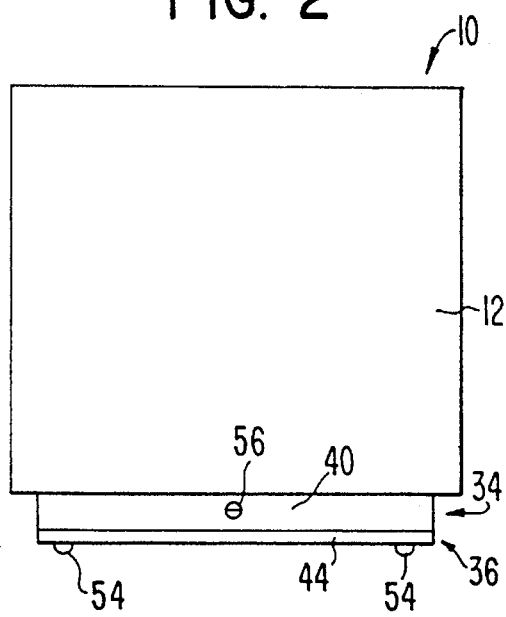
FIG. 2 is a left side view of the equipment housing and support system shown in FIG. 1.
Figure 3:
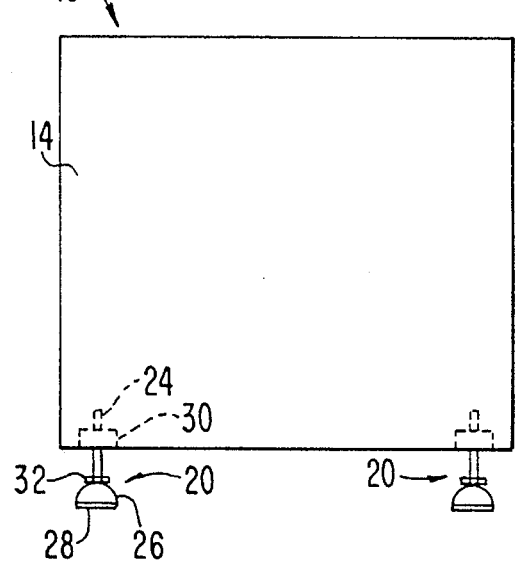
FIG. 3 is a right side view of the equipment housing and support system shown in FIG. 1.
Figure 5:
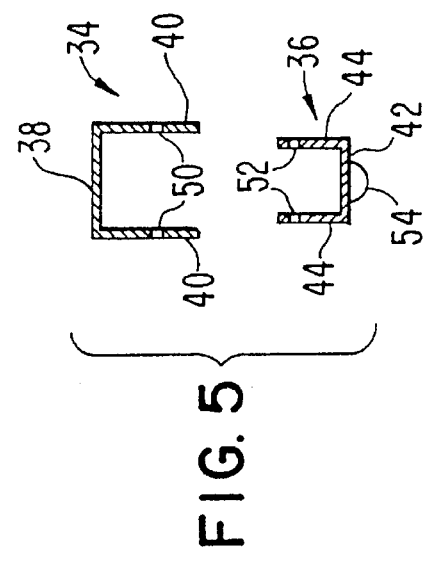
FIG. 5 is a sectional view taken along line V—V of FIG. 4.

As will be apparent from FIG. 5, the side panels 44 of channel member 36 are closer together than the side panels 40 of channel member 34. This permits channel member 36 to be nested inside channel member 34. In this nested position, a bolt 56 (see FIG. 2) having a threaded end region is inserted through holes 50 and 52 to pivotally mount channel member 36 with respect to channel member 34. A nut 58 is screwed onto the threaded region to secure bolt 56. Floor panel 38 of channel member 34 (FIG. 5) or floor panel 42 of channel member 36 (FIGS. 9 and 10) is screwed to the under-side of housing 10.

FIGS. 6 through 12 illustrate various additional pivot connections and corresponding modifications of pivoting trestle 22 contemplated by the present invention. For example, in FIG. 6, instead of U-shaped channel members 34 and 36, pivoting trestle 22 includes a member 60 having a generally L-shaped cross section, and a member 62 having a generally inverted T-shaped cross section. Member 60 has a floor panel 64 (typically fastened to housing 10) and a side panel 66. Member 62 includes a floor panel 68, and a side panel 70. As with the aforementioned the U-shaped members, holes (not illustrated) can be provided in both members 60, 62, for receiving bolt 56 so that member 62 can be pivotally mounted to member 60. Floor panel 64 of member 60 is fastened, for example by screws or welding, to the under-side of housing 10. Rubber pads 54 are adhesively attached to the outer side of floor panel 68.

Alternatively, as illustrated in FIG. 7, pivoting trestle 22 can include two members 60, each being fastened to housing 10 so that the two side panels 66 are adjacent to each other and form a channel therebetween for receiving side panel 70. Similarly, holes (not illustrated) can be provided through the side panels of both members 60, 62, for receiving bolt 56 so that member 62 can be pivotally mounted to member 60. Floor panels 64 of members 60 are fastened, for example by screws or welding, to the under-side of housing 10. Rubber pads 54 are adhesively attached to the outer side of floor panel 68.

If desired, instead of member 62, a member 72 having a generally L-shaped cross section can be provided (as illustrated in FIG. 8). In this embodiment, member 72 has a floor panel 74 and a side panel 76 placed between adjacent side panels 66 of two L-shaped members 60. Typically, holes (not shown) are provided through the side panels of both members 60, 72, for receiving bolt 56 so that member 72 is pivotally mounted to member 60. Floor panels 64 of members 60 are fastened to the under-side of housing 10. Rubber pads 54 are adhesively attached to the outer side of floor panel 74.

As illustrated in FIG. 9, additional side panels 78 can be provided offering more support to pivoting trestle 22. For example, one or both of the members can have a generally E-shaped cross section, with holes (not shown) being provided through all of the side panels for receiving bolt 56. Of course, one of the floor panels of a respective member is fastened to the under-side of housing 10. As previously described, rubber pads 54 are adhesively attached to the outer side of the floor panel.

FIG. 10 illustrates the components of FIG. 5 being assembled so that floor member 42 of channel member 36 is fastened to the underside of housing 10. Similar to the embodiment of FIG. 5, side panels 44 of channel member 36 are closer together than the side panels 40 of channel member 34, so that channel member 36 can be nested inside channel member 34. In this nested position, bolt 56 is inserted through holes within side panels 44, 40 to pivotally mount channel member 34 with respect to channel member 36. Rubber pads 54 are adhesively attached to the outer side of floor panel 38.

As will be appreciated, various other combinations of the members comprising pivoting trestle 22 are possible, depending on the load and size to be carried, as well as the center of mass of the load.

Referring now to FIGS. 11 and 12, additional pivot connections of the pivoting trestle 22 are illustrated. For example, in FIG. 11, instead of providing holes 50 and 52 within the members of pivoting trestle 22 and using a bolt 56 as the pivot connection, one of the members 80 can be provided with a ball 82 attached thereto. The other member 84 includes a correspondingly-shaped socket 86 for receiving ball 82 to form a ball-and-socket connection 88. Alternatively, instead of ball 82 and socket 86, a cylinder 90 can be provided on one of the members, and sleeve 92 can be provided on the other member to form a cylinder-and-sleeve connection 94. Typically, regardless of the type of pivot connection used, one of the members is fastened to the under-side of housing 10, and the outer side of the floor panel of the other member has rubber pads 54 adhesively attached thereto as previously described.

Not only does the member fastened to the under-side of housing 10 serve as a mounting element for pivotally mounting the other member, it also increases the rigidity of housing 10.

To use support system 16, one first shortens screw-adjustable legs 20 to an initial height and places equipment housing 10 at a desired position in bench 18. If either the front side or the back side of housing 10 is too high, one of the legs 20 is lengthened as appropriate to bring the top side of housing 10 to a level condition in the fore-and-aft direction. As this occurs the members pivot about bolt 56 (or ball-and-socket connection 88 or cylinder-and-sleeve connection 94) with respect to each other and thus to housing 10. The cutaway portions identified by dotted lines 48 in FIG. 4 increase the degree of pivoting that is available with the embodiment shown in FIG. 5, although all of the embodiments can have similar cutaway portions and similar degrees of pivoting. After housing 10 has been levelled fore-and-aft, it must be levelled left-to-right. This is accomplished by shortening or lengthening both legs 20 in unison as appropriate. After left-to-right levelling, the fore-and-aft levelling should be checked again and one of the legs 20 should be adjusted if necessary.

It will be apparent that support system 16 provides the stability of three-point support; if four legs (one at each corner) were used, housing 10 might teeter back and forth if one of the legs were slightly mis-adjusted. Providing two adjustable legs at one end permits housing 10 to be levelled in both the fore-and-aft direction and the left-to-right direction. While the primary advantages of three-point support could be achieved by positioning a third screw-adjustable leg 20 at the center of left end 12, pivoting trestle 22 is preferable since it increases the rigidity of housing 10 and avoids concentrating a major portion of the weight of the equipment in housing 10 at a single region on lab bench 18. The weight of the left half of the equipment in housing 10 is instead distributed to rubber elements 54 at separated spots on bench 18. Furthermore, trestle 22 is more attractive than a centrally disposed leg would be.

It will be understood that the above description of the present invention is susceptible to various modifications, changes, and adaptations, and the same are intended to be comprehended within the meaning and range of equivalents of the appended claims.

What is claimed is:

1. A support system for a housing having first and second ends, comprising:

an elongated member having a central portion, a floor panel and a side panel;

pivoting means for pivotally connecting the central portion of the elongated member to the housing adjacent the second end thereof so that the elongated member is generally horizontal; and two adjustable-length legs mounted on the housing adjacent the first end thereof.

2. The support system of claim 1, wherein the pivoting means comprises a member having a floor panel and a side panel, the side panel of the pivoting means being pivotally connected to the side panel of the elongated member.

3. The support system of claim 2, wherein the pivoting means member has a generally L-shaped cross-section, and the elongated member has a generally T-shaped cross-section.

4. The support system of claim 3, wherein the pivoting means member comprises two adjacently placed members forming a channel between their respective side panels, the side panel of the elongated member being located within the channel.

5. The support system of claim 2, wherein the pivoting means member and the elongated member each have a generally L-shaped cross-section.

6. The support system of claim 5, wherein the pivoting means member comprises two adjacently placed members forming a channel between their respective side panels, the side panel of the elongated member being located within the channel.

7. The support system of claim 1, wherein the elongated member comprises a floor panel and at least three side panels to form a generally E-shaped cross-section, and the pivoting means comprises a member having a floor panel and a plurality of side panels to form a generally U-shaped cross-section, the side panels of the pivoting means being pivotally connected to the side panels of the elongated member.

8. The support system of claim 1, wherein the pivoting means includes a ball-and-socket connection.

9. The support system of claim 1, wherein the pivoting means includes a cylinder-and-sleeve connection.

* * * * *